US010815131B2

(12) United States Patent
Sparke

(10) Patent No.: US 10,815,131 B2
(45) Date of Patent: Oct. 27, 2020

(54) DEVICE FOR IMPROVING WATER QUALITY

(71) Applicant: ONE WATER NATURALLY PTY. LTD., Frenchs Forest, New South Wales (AU)

(72) Inventor: David Sparke, Frenchs Forest (AU)

(73) Assignee: ONE WATER NATURALLY PTY. LTD., Frenchs Forest (AU)

( * ) Notice: Subject to any disclaimer, the term of this patent is extended or adjusted under 35 U.S.C. 154(b) by 0 days.

(21) Appl. No.: 16/383,600

(22) Filed: Apr. 13, 2019

(65) Prior Publication Data
US 2019/0233303 A1 Aug. 1, 2019

Related U.S. Application Data

(62) Division of application No. 15/240,758, filed on Aug. 18, 2016, now Pat. No. 10,301,188.

(30) Foreign Application Priority Data

Aug. 18, 2015 (AU) .................... 2015903331

(51) Int. Cl.
C02F 1/00 (2006.01)
B01D 35/147 (2006.01)
(Continued)

(52) U.S. Cl.
CPC ............. C02F 1/001 (2013.01); C02F 1/004 (2013.01); E03B 3/02 (2013.01); E03F 1/00 (2013.01);
(Continued)

(58) Field of Classification Search
CPC ........... C02F 2301/043; C02F 2209/42; B01D 35/147
(Continued)

(56) References Cited

U.S. PATENT DOCUMENTS 5,372,711 A 12/1994 Sill
5,407,091 A 4/1995 Wallis
(Continued)

FOREIGN PATENT DOCUMENTS

AU 2004100956 A4 12/2004
WO 2007/030735 A1 3/2007

Primary Examiner — Nam X Nguyen
Assistant Examiner — Julia L. Wun
(74) Attorney, Agent, or Firm — Maschoff Brennan

(57) ABSTRACT

Disclosed herein is a device for improving the quality of rainwater/stormwater by removing pollutants therefrom. The device comprises a substantially cylindrical tank having an inlet for entry of liquid and an outlet for discharge of liquid. A coarse filter is provided in the tank for filtering relatively coarse pollutants from inflowing liquid, the coarse filter dividing the tank into an upstream first region/chamber and a downstream second region/chamber. A fine pollutant discharge opening is located between the coarse filter and the outlet. A valve comprising a valve member for opening and closing the fine pollutant discharge opening is configured to automatically open the fine pollutant discharge opening to discharge an initial volume of the liquid passing the coarse filter, the valve member being biased toward a configuration for closure of the opening during an inflow event. The liquid passing through the opening bypasses the outlet.

12 Claims, 7 Drawing Sheets

(51) Int. Cl.
*B01D 29/56* (2006.01)
*E03F 1/00* (2006.01)
*E03B 3/02* (2006.01)
*E03F 5/04* (2006.01)
*C02F 103/00* (2006.01)

(52) U.S. Cl.
CPC ............ *E03F 5/0404* (2013.01); *B01D 29/56* (2013.01); *B01D 35/147* (2013.01); *C02F 2103/001* (2013.01); *C02F 2103/002* (2013.01); *C02F 2209/40* (2013.01); *C02F 2209/42* (2013.01); *C02F 2301/043* (2013.01); *Y02A 20/108* (2018.01); *Y02A 20/156* (2018.01)

(58) Field of Classification Search
USPC ....... 210/170.03, 170.05, 121, 114, 116, 123
See application file for complete search history.

(56) References Cited

U.S. PATENT DOCUMENTS

| | | |
|---|---|---|
| 5,433,845 A | 7/1995 | Greene et al. |
| 5,836,116 A * | 11/1998 | Widmann ................. E03B 3/02 52/169.7 |
| 6,182,680 B1 | 2/2001 | Hart |
| 6,187,178 B1 | 2/2001 | Lecornu et al. |
| 7,048,849 B2 | 5/2006 | Wade |
| 7,096,627 B2 | 8/2006 | Wade |
| 7,550,077 B2 | 6/2009 | Graf |
| 8,287,726 B2 * | 10/2012 | Williams ............... B01D 35/10 210/108 |

* cited by examiner

DEVICE FOR IMPROVING WATER QUALITY

TECHNICAL FIELD

The present disclosure relates to a device for improving water quality. The device has been developed primarily for mechanically removing pollutants, such as gross pollutants, organic waste, silt, sediment, nutrients including phosphorous and nitrogen along with hydrocarbon material, oils and the like, from rainwater and stormwater by separation and will be described hereinafter with reference to this application. However, it will be appreciated that the device is not limited to this particular application and may also be used for removing pollutants from other liquid runoff or wastewater, such as for reducing nutrients or diverting fertilisers from farm runoff, or for removing sediment or other pollutants from water discharged during processing or washing of various items, such as during washing of root vegetables.

BACKGROUND

Various devices exist for removing pollutants, such as litter and sediment above 5 mm in size, from rainwater/stormwater runoff. Examples include the gross pollutant traps (GPTs) disclosed in AU2004100956 and WO2007/030735. However, as known GPTs are configured for the removal of large pollutants in intense volume water flows, they provide limited removal of fine sediment and dissolved pollutants. Also, conventional GPTs contaminate the whole of the water flow to the highest level of any contamination passing through the system. Another problem with known GPTs is that settled contaminants in stormwater collected therein tend to be resuspended by subsequent stormwater inflow.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Throughout this specification:

the word "comprise", or variations such as "comprises" or "comprising", will be understood to imply the inclusion of a stated element, integer or step, or group of elements, integers or steps, but not the exclusion of any other element, integer or step, or group of elements, integers or steps;

the term "inflow event" will be understood to mean an event causing a flow rate of liquid passing the coarse filter to be greater than 5 litres per minute or greater than 1.65% of the maximum flow rate through the device; and the term "tank' will be understood to mean a tank or any other form of reservoir or enclosure for holding a liquid.

Among other things, disclosed herein is a device for improving water quality, said device comprising:

a tank;
an inlet for entry of water into the tank;
an outlet for discharge of water from the tank;
a coarse filter in the tank for filtering gross pollutants from water fed into the tank through the inlet, the coarse filter dividing the tank into an upstream first region and a downstream second region, the coarse filter allowing relatively fine pollutants in the water to pass into the second region whilst inhibiting relatively coarse pollutants from passing into the second region, wherein the inlet is associated with the first region of the tank and the outlet is associated with the second region of the tank;

a bypass mechanism in the tank, the bypass mechanism having a first configuration in which water passing the coarse filter is directed to bypass the outlet, and a second configuration in which water passing the coarse filter is directed to flow through the outlet, the bypass mechanism:

being configured to automatically adopt the first configuration to cause an initial volume of the water passing the coarse filter to bypass the outlet, and being biased toward the second configuration during an inflow event.

The bypass mechanism may comprise one or more flow barriers that, in the first configuration, direct water passing the coarse filter to flow through a bypass opening rather than through the outlet, and that, in the second configuration, direct water passing the coarse filter to flow through the outlet.

The one or more flow barriers may comprise a valve member of one or more valve and/or one or more gate.

The bypass mechanism may be configured to move between the first and second configurations in response to a force, such as buoyancy, applied directly or indirectly to the one or more flow barriers by at least a proportion of the water entering the device through the inlet. The device may comprise one or more drain openings for drainage of water after an inflow event to relieve the force applied to the one or more flow barriers by the water and thereby to facilitate resetting the bypass mechanism to the first configuration.

In the second configuration, the one or more flow barriers may close, or at least substantially close, the bypass opening and/or open the outlet, and in the first configuration, the one or more flow barriers may open the bypass opening and/or close the outlet. The one or more flow barriers may be configured to cause at least part of the water flow passing the coarse filter to bypass the outlet if a predetermined weight of fine pollutants accumulates on the one or more flow barriers.

The one or more flow barriers may comprise a float to facilitate automatically moving the bypass mechanism between the first and second configurations. The float may be part of the one or more flow barriers. The float may be housed in a float chamber that receives at least part of the initial volume of the water passing the coarse filter, such that inflow of water into the float chamber facilitates raising the float and moving the bypass mechanism to the second configuration. In a first family of embodiments, with the bypass mechanism in the first configuration, said at least part of the initial volume of the water passing the coarse filter may flow to the float chamber via the bypass opening. The float chamber may have one or more drain openings therein for draining water from the float chamber. In a second family of embodiments, the one or more flow barrier may comprise: a valve member biased into sealing engagement with the outlet, such as by gravity and/or by a spring; and a container for receiving at least part of the initial volume of the water passing the coarse filter, the container being configured to move between a first configuration and a second configuration as water accumulates therein, wherein the container is connected to the valve member, for example by a tether, such that, with the bypass mechanism in the first configuration, accumulation of water in the container causes the container to move, thereby moving the valve member out of sealing engagement with the outlet to define the second configuration of the bypass mechanism. The container may have one or more drain openings therein for draining water from the container. When the container is in the second configuration, it acts as a gate for substantially preventing water passing the coarse filter from flowing through the bypass opening. The valve member biased into sealing engagement with the outlet may be buoyant and may, along with the accumulation of water in the container, facilitate automatically moving the bypass mechanism between the first and second configurations. In either family of embodiments, drainage of water through the one or more drain openings may reset the bypass mechanism to the first configuration after an inflow event. The one or more drain openings may have a combined area that allows the float to rise during an inflow event.

The device may be configured such that the bypass mechanism is delayed from adopting the second configuration:

for a predetermined time, which may be greater than 1 minute and less than 5 minutes, and in some embodiments may be around 2 minutes, from commencement of an inflow event of at least the same duration; or until a predetermined initial volume of water, such as an initial volume of between 0.3 m$^3$ and 0.9 m$^3$ of water, has been discharged after commencement of an inflow event of at least the same volume, or until each square metre of the catchment served by the device has received, on average, greater than 1.2 mm of precipitation that reaches the device.

In the first family of embodiments, the volume of the float chamber may govern the delay in the bypass mechanism adopting the second configuration In the second family of embodiments, a relationship between the rate at which water accumulates in the container and the magnitude of the force(s) biasing the valve member toward sealing engagement with the outlet governs the delay in the bypass mechanism adopting the second configuration.

In the first family of embodiments, one or more restricted openings may be provided in or around the one or more flow barriers to allow water that has passed the coarse filter to pass into the float chamber when the valve is in the second configuration. The combined area of the one or more restricted openings may be substantially equal to the combined area of the one or more drain openings. The float may have a buoyancy selected to cause the one or more flow barriers to at least partially open the bypass opening if a predetermined weight of fine pollutants accumulates on the one or more flow barriers.

In the first family of embodiments, the inlet may be oriented to direct water entering the tank to flow in a substantially spiral path around a cylindrical wall of the first region. The inlet may be curved with a radius similar to that of the first region to provide a smooth transition for water entering the first region.

In the first family of embodiments, an upstream surface of the coarse filter may be sloped to direct relatively coarse pollutants toward a coarse pollutant discharge opening. The upstream surface of the coarse filter may be substantially concave and a coarse pollutant discharge opening may be located substantially centrally on the concave surface. The upstream surface of the coarse filter may be substantially conical. One or more substantially spiral vanes or channels may be formed on the upstream surface of the coarse filter. The coarse pollutant discharge opening may comprise a discharge chute that extends longitudinally through the second region. In embodiments with a float chamber, the discharge chute may also extend longitudinally through the float chamber. The fine pollutant discharge opening may be annular and disposed around the discharge chute. The coarse pollutant discharge opening may direct coarse pollutants to a sump. The bypass opening may discharge into the sump.

In the second family of embodiments, the coarse filter may be shaped to slow the velocity of water entering the device. The upstream surface of the coarse filter may define one or more channel into which water entering the device is directed. The channels may direct relatively coarse pollutants in the water toward a coarse pollutant discharge opening. The inlet and the coarse pollutant discharge opening may be at opposite ends of the device.

A fine filter may be provided downstream of the coarse filter to filter relatively fine pollutants in water passing from the second region to the outlet. The fine filter may have openings therein configured to capture pollutants sized greater than 0.4 mm, greater than 0.5 mm, greater than 0.6 mm, greater than 0.7 mm, greater than 0.8 mm, greater than 0.9 mm or greater than around 1 mm. The fine filter may comprise a 0.4 mm, 0.5 mm, 0.6 mm, 0.7 mm, 0.8 mm, 0.9 mm or around 1 mm mesh screen. The fine filter may comprise a 40-210 micron screen, which may be a nylon sieve mesh fabric screen. In the first family of embodiments, the fine filter may extend substantially circumferentially within the second region. In the second family of embodiments, the fine filter may be provided immediately upstream of the valve member biased into sealing engagement with the outlet and may be at least partially defined by perforated walls of a valve chamber in which the valve member is housed.

The coarse filter may have openings therein configured to capture pollutants greater than a predetermined size. The openings in the coarse filter may be 5 mm in diameter. Hoods may extend partially over openings in the coarse filter. The hoods may extend from the downstream end of the openings in the coarse filter and on the downstream side of the coarse filter. The hooded openings may have a configuration similar to those of a cheese grater.

The device may comprise an access opening to the first region for facilitating removal of captured gross pollutants, access to internal components of the device for maintenance, and/or removal of internal components for flushing out of the device on commissioning. A removable lid may cover the access opening. A safety barrier may extend across the access opening below the lid to restrict personal entry into the device. The lid may be sufficiently strong to support the weight of motor vehicles. The lid may have a lock mechanism to restrict access without a corresponding access tool, such as a key. The access tool may be captively engaged with the lock mechanism when it is unlocked to prevent removal of the access tool until the lock mechanism is re-locked. The lock mechanism may be configured not to re-lock unless the lid is closed. The lock mechanism may be configured to hold the lid in place if the first region fills with water and applies pressure to the underside of the lid, for example in extreme inflow events or in the case of a blockage in or downstream of the device.

BRIEF DESCRIPTION OF DRAWINGS

Embodiments will now be described, by way of example only, with reference to the accompanying drawings, in which.

DETAILED OF EMBODIMENTS

Figure 1:
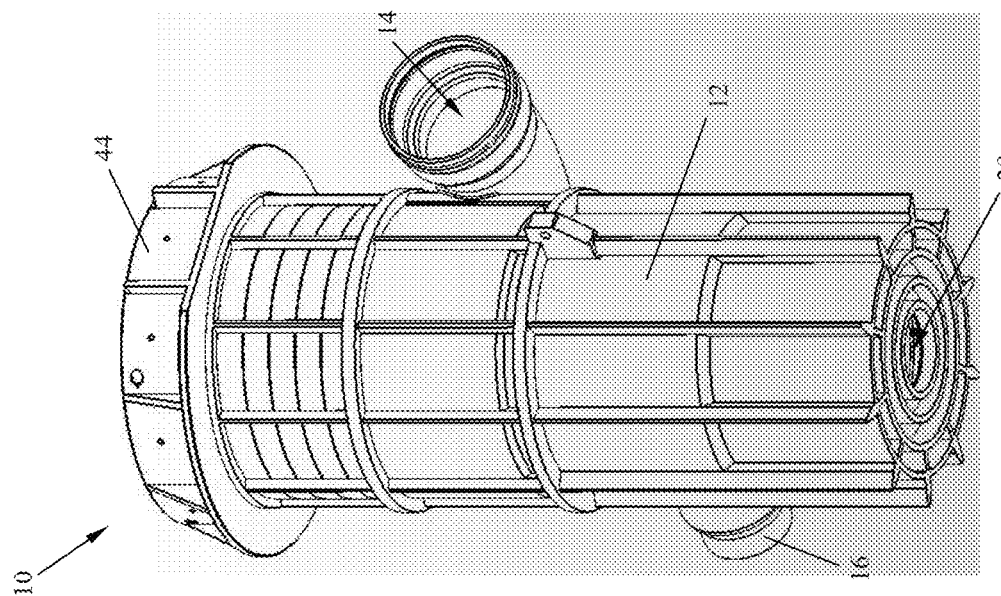
FIG. 1 is a first perspective view of a first embodiment of a water quality improvement device in accordance with the present disclosure.
Figure 2:
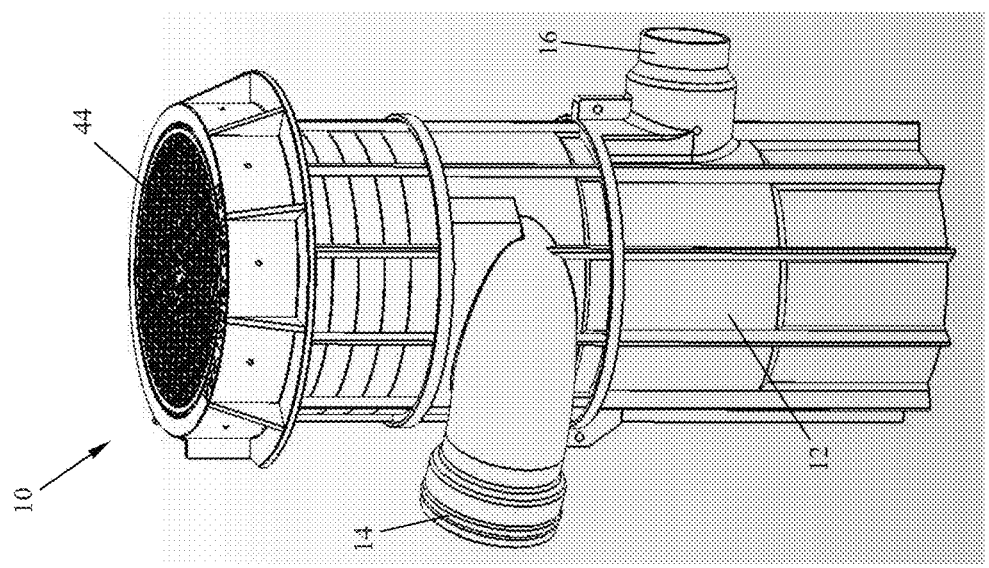
FIG. 2 is a second perspective view of the device of FIG. 1.
Figure 3:
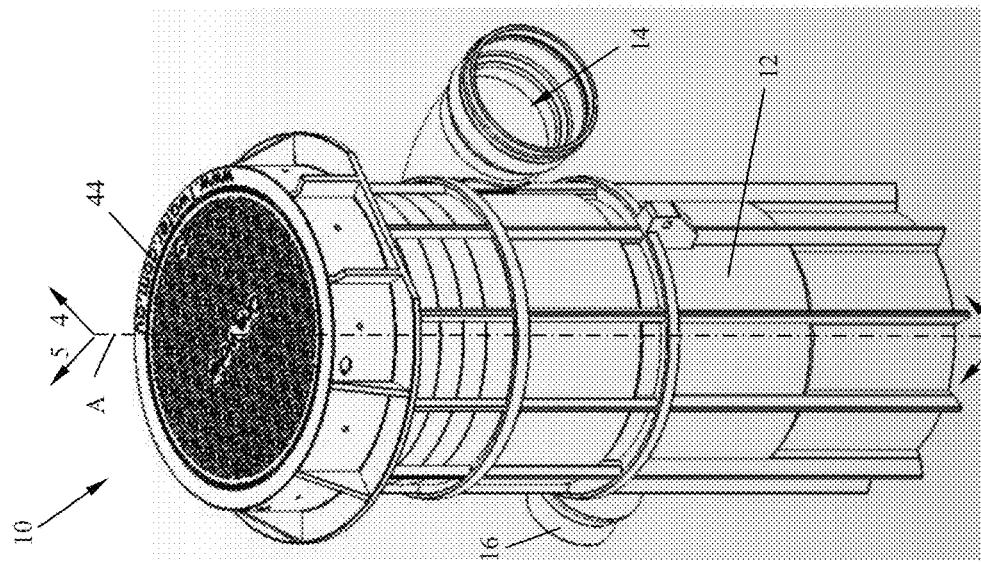
FIG. 3 is a third perspective view of the device of FIG. 1.
Figure 5:
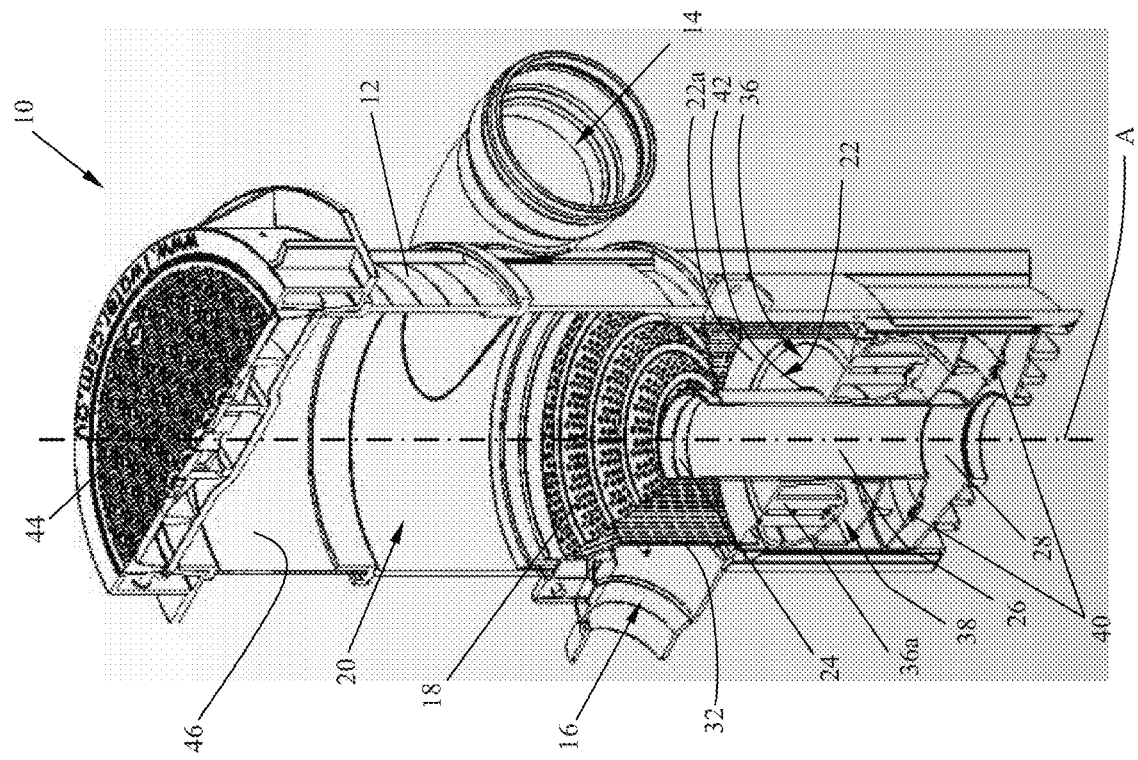
FIG. 5 is a cross sectional view through the device of FIG. 1, taken in a plane containing lines 5 and looking in the direction of lines 4 of FIG. 1, shown with its fine pollutant discharge opening closed during an inflow event.
Figure 4:
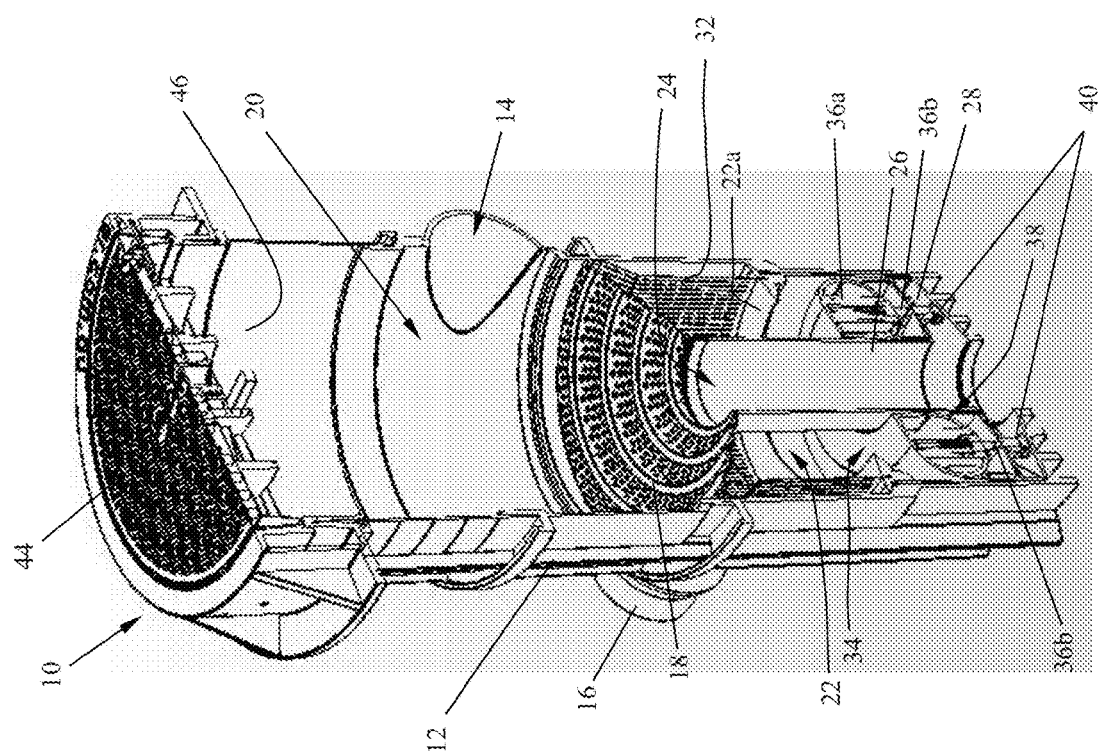
FIG. 4 is a cross sectional view through the device of FIG. 1, taken in a plane containing lines 4 and looking in the direction of lines 5 of FIG. 1, shown with its fine pollutant discharge opening open ready for an inflow event.
Figure 6:
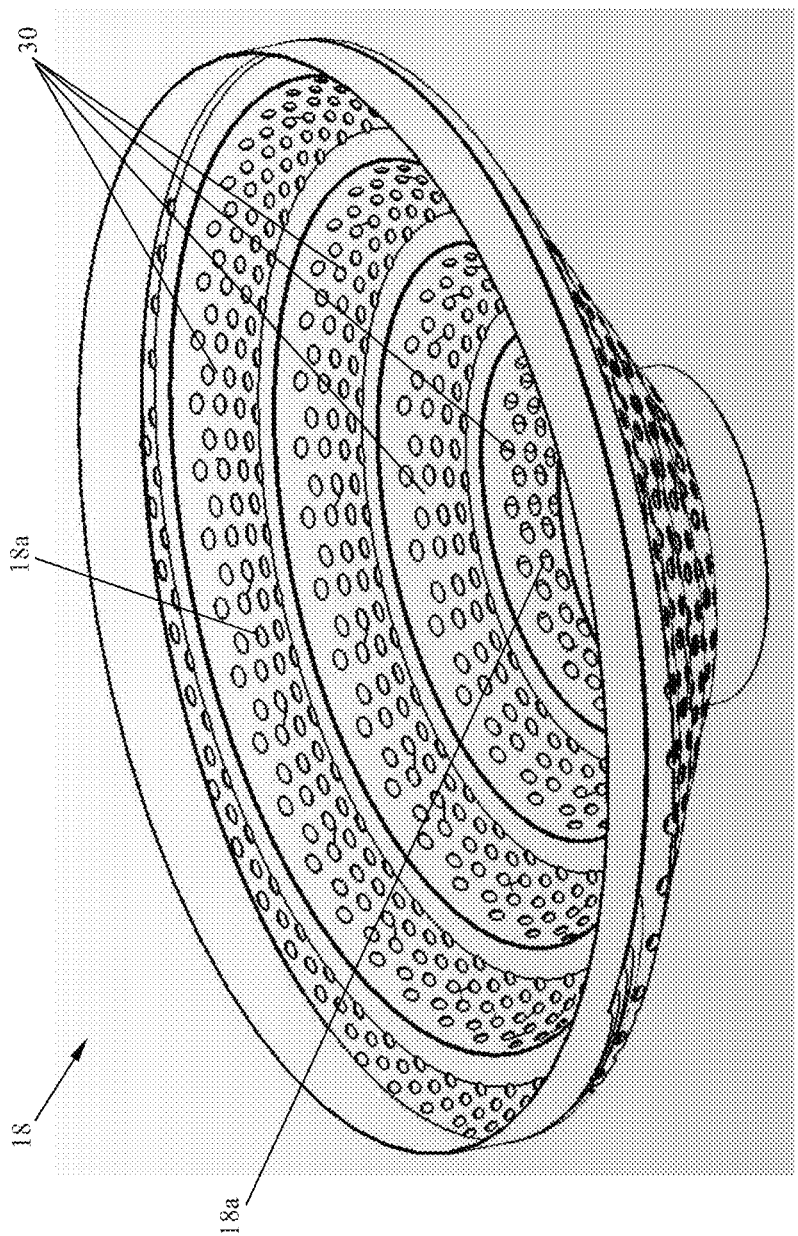
FIG. 6 is an enlarged perspective view of the coarse filter of the device of FIG. 1.

Referring to the drawings, and initially to FIGS. 1-6, there is shown a water quality improvement device 10 for removing pollutants from stormwater. The device 10 comprises a substantially cylindrical tank 12 defining a longitudinal axis A that is oriented vertically in use. An inlet 14 and an outlet 16, respectively for entry and discharge of stormwater to and from the tank 12 are provided.

A coarse filter 18 extends diametrically across the tank and divides the tank 12 into an upstream first region/chamber 20 and a downstream second region/chamber 22. Openings 18a in the upstream end of the coarse filter 18 are configured to inhibit or "trap" gross pollutants in the stormwater sized greater than around 5 mm, whilst allowing the stormwater and smaller pollutants therein to pass into the second region/chamber 22. The openings 18a are hooded, having a form similar to the openings of a cheese grater, with the hoods of the openings 18a extending on the downstream side of the coarse filter 18 and from the downstream end of the openings 18a. The upstream surface of the coarse filter 18 is substantially conical, tapering to a central coarse pollutant discharge opening 24. A discharge chute 26 extends from the discharge opening 24 longitudinally through the second chamber 22 and into a sump 28. Substantially spiral vanes or channels 30 are formed on the upstream surface of the coarse filter 18. Due to gravity, gross pollutants captured by the coarse filter fall down the conical surface and through the discharge opening 24 and chute 26 into the sump 28.

A fine filter 32 extends substantially circumferentially within the second chamber 22 to inhibit or "trap" relatively fine pollutants sized greater than around 0.5 mm to 1 mm from stormwater passing through the coarse filter 18, whilst allowing the stormwater and smaller or dissolved pollutants therein to pass to the outlet 16. The fine filter may comprise a 1 mm mesh screen and/or a 40-210 micron nylon sieve mesh fabric screen.

An annular bypass opening 34 is provided in the base 22a of the second chamber 22, around the discharge chute 26.

The bypass opening 34 is located downstream of the coarse filter 18 and upstream of the outlet 16. Stormwater passing through the bypass opening 34 bypasses the outlet 16.

A bypass mechanism/valve 36 comprising a valve member 36a is provided for opening and closing the fine pollutant discharge opening 34. The valve member 36a takes the form of a buoyant float housed in a float chamber 38. The valve member 36a is slidably mounted on spindles 36b, which extend longitudinally through the float chamber to guide the valve member 36a as it moves between an open and closed configuration. The valve member 36a and float chamber 38 are annular, with an inner wall of the float chamber 38 being defined by the discharge chute 26, which extends longitudinally through the float chamber. With the valve 36 open, the second chamber 22 and the float chamber 38 are in fluid flow communication via the fine pollutant discharge opening 34. The float chamber 38 has a plurality of drain openings 40 therein for draining the float chamber after an inflow event, thereby to reset the valve 36 to an open configuration for a future inflow event. Stormwater passing through the drain openings 40 passes into the sump 28. The drain openings 40 have a combined area selected to cause the valve member 36a to rise during an inflow event. The combined area of the drain openings 40, along with the volume of the float chamber 38, are selected to cause the fine pollutant discharge opening 34 to remain open for around 2 minutes, depending on the inflow rate, until an initial volume of approximately 0.3 $m^3$ to 0.9 $m^3$ of stormwater has been discharged after commencement of an inflow event of at least the same duration or until each square metre of the catchment served by the device 10 has received, on average, greater than 1.2 mm of precipitation/inflow that reaches the device. During this time interval, the valve member 36a buoyantly rises to close the pollutant discharge opening 34. If the inflow rate into the device 10 is less than 5 L/min, or less than 1.65% of the maximum flow rate through the device, the inflow may contain a relatively high concentration of dissolved pollutants. In such low flows, the valve member 36a will not rise such that the valve 36 and fine pollutant discharge opening 34 remain open to allow the polluted inflow to bypass the outlet 16 for treatment by another method before being discharged back as an environmental flow.

A restricted opening 42 is provided between the valve member 36a and the fine pollutant discharge opening 34 to allow stormwater to pass at a slow rate from the second chamber 22 into the float chamber 38 when the valve 36 is closed. The area of the restricted opening 42 is substantially equal to or greater than the combined area of the drain openings 40 to maintain the float chamber 38 full during an inflow event without requiring the valve 36 to open. However, the valve member 36a has a buoyancy selected to cause the valve 36 to at least partially open if a predetermined weight of fine pollutants accumulates on the valve member 36a, and thereby to discharge the accumulated fine pollutants into the sump 28 via the float chamber 38.

The inlet 14 is oriented to direct stormwater entering the tank 12 to flow in a substantially spiral path around the wall of the first chamber 20. The inlet 14 is curved with a radius similar to that of the first chamber 20 to provide a smooth and hydrodynamic slowing transition as stormwater enters the first chamber 20 from the inlet 14.

The device 10 comprises a removable lid 44 to facilitate removal of captured gross pollutants. The lid 44 covers an access opening 46 in the first chamber 20, through which gross pollutants and stormwater can be extracted from the sump 28. The lid 44 is sufficiently strong to support the weight of motor vehicles. The lid 44 also facilitates removal of or access to internal components of the device 10 for maintenance and/or removal of internal components for flushing out of the device on commissioning. A removable safety barrier may be extend across the access opening 46 below the lid to prevent unauthorised or accidental personal entry into the device 10, including entry by children, when the lid 44 is removed.

The lid 44 may have a lock mechanism to restrict access without a corresponding access tool, such as a key. The access tool may be captively engaged with the lock mechanism when it is unlocked to prevent removal of the access tool until the lid 44 is closed and the lock mechanism is re-locked. The lock mechanism may be configured to hold the lid 44 in place if the first chamber 20 fills with liquid and applies pressure to the underside of the lid, for example in extreme inflow events or in the case of a blockage in or downstream of the device 10.

It will be appreciated that the illustrated device 10 provides significant advantages over conventional GPTs and other water quality improvement devices. In particular, the device 10 significantly improves the removal of fine contaminants, including sediment and dissolved pollutants, from stormwater by automatically dumping the initial inflow following an inflow event, which tends to contain a higher concentration of fine contaminants, and periodically dumping fine contaminants that accumulate on the valve member 36a. This form of separation reduces the loading of pollutants carried by the stormwater passing through outlet 16, such that a substantially lower volume of pollutants need to be treated or filtered by a downstream process prior to the waste stream being released to a receiving waterway. The device 10 also facilitates a greater volume of stormwater harvested being directed to storage, compared to a conventional GPT that does not syphon off an initial, often highly polluted, volume of stormwater. Such conventional GPTs disadvantageously contaminate all of the collected stormwater with the often highly polluted initial inflow. The automatic resetting of the valve 36 to its open configuration after an inflow event, and in low inflow situations, advantageously ensures that the device 10 is ready to dump the initial portion of a future inflow event and also allows continued removal of pollutants even when the flow is impractical to harvest.

The hoods on the downstream side of openings 18a in the coarse filter 18 advantageously reduce the build-up of pollutants such as paper and sinuous/fibrous material on the coarse filter 18 by creating a ramp that guides coarse pollutants thereover to facilitate self-cleaning, whilst allowing water and fine pollutants to drain into the second chamber 22. Without the hooded openings 18a, coarse pollutants may catch on the downstream edge of the coarse filter openings and gradually accumulate and cause obstruction, thereby blocking the device 10, reducing its efficiency and requiring more regular maintenance. It will also be appreciated that the spiral vanes/channels 30 advantageously hold lower water flows in the coarse filter 18 for a longer period to increase pollutant capture rate in low intensity inflows. The spiral vanes/channels 30 are also intended to improve the hydrodynamic action of the inflow, holding the water stream in the coarse filter 18 for as long as possible to increase the volume of water passing into the second chamber 22. The spiral vanes/channels 30 are also intended to dislodge pollutants that may accumulate on the upstream side of the coarse filter 18, and to generally facilitate flow of larger pollutant material downwards towards the discharge opening 24 and chute 26.

The device 10 also facilitates a distributed micro system of stormwater capture that concentrates the catchment contamination in the area of operation serviced by the device 10. The device 10 will further allow the potential for stormwater drainage to be at or near surface level filtration and separation, it will enable a moderate reduction or mitigation of flooding and the effects of widespread contamination of a flooding event in major streams and canals, wetlands and rivers. The device 10 can also facilitate the collection and redirection of pollutants to a holding cavity as a retention/delayed system of stormwater release, the device 10 being an independent device not reliant on catchment overflows, thereby better managing the water cycle in rainfall through to flooding events when applied to the design specification of Annual Recurrent Intensity rainfall events. The device 10 can also be configured for use with roof capture systems for protected catchments.

Figure 7:
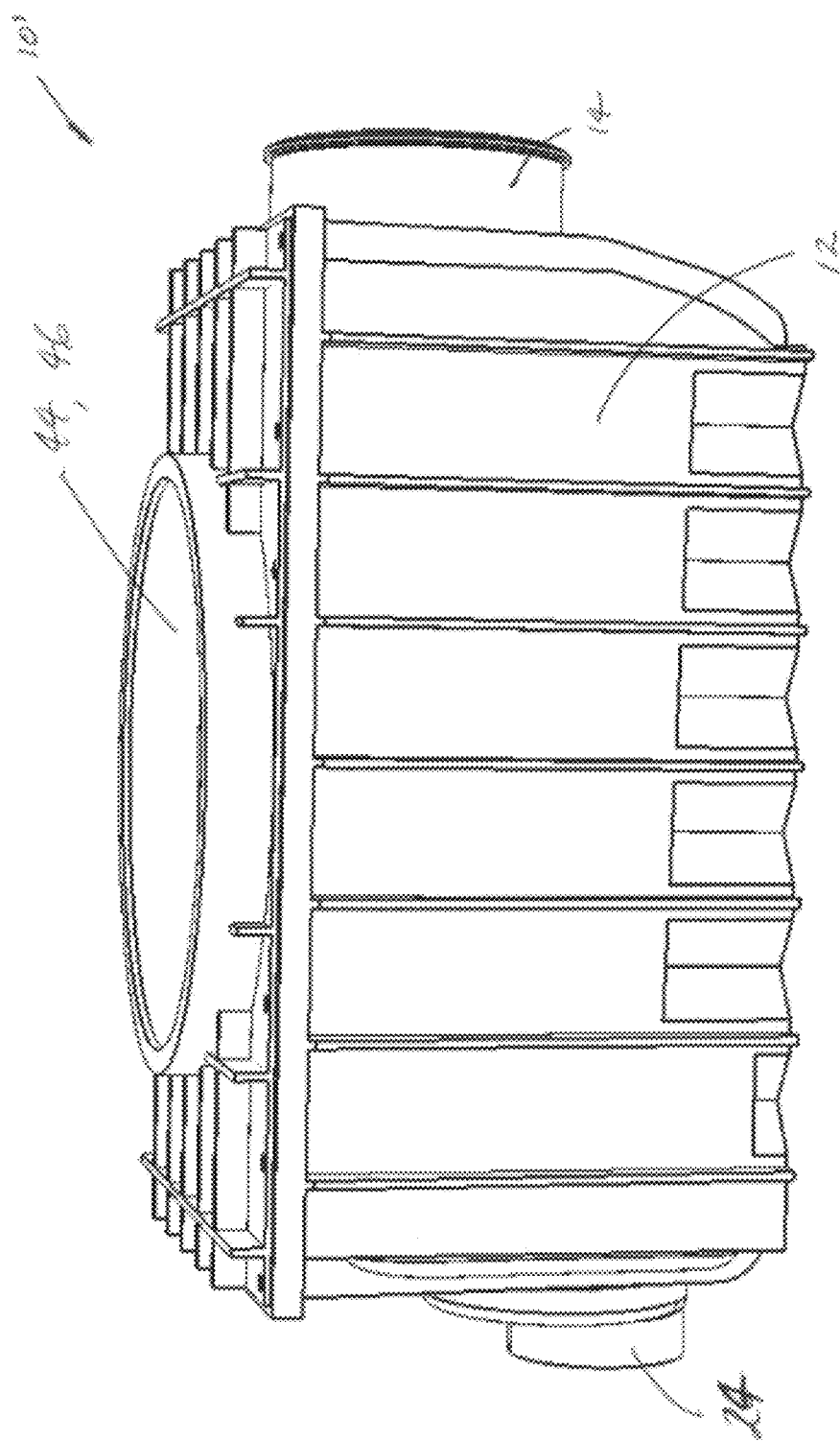
FIG. 7 is a perspective view of a second embodiment of a water quality improvement device in accordance with the present disclosure.
Figure 8:
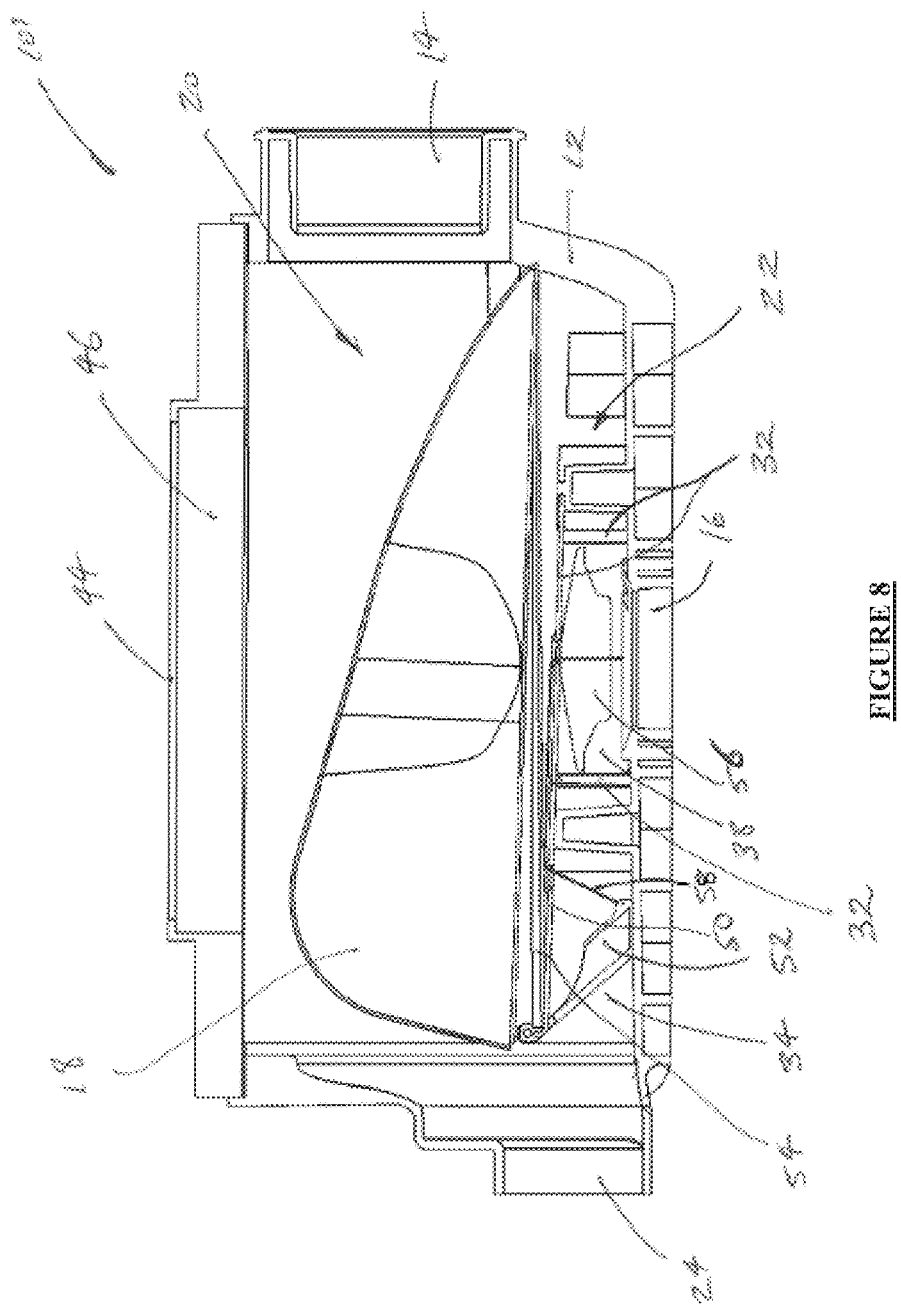
FIG. 8 shows a central vertical longitudinal cross section of the device of FIG. 7, wherein the device is shown with its bypass opening open ready for an inflow event.
Figure 10:
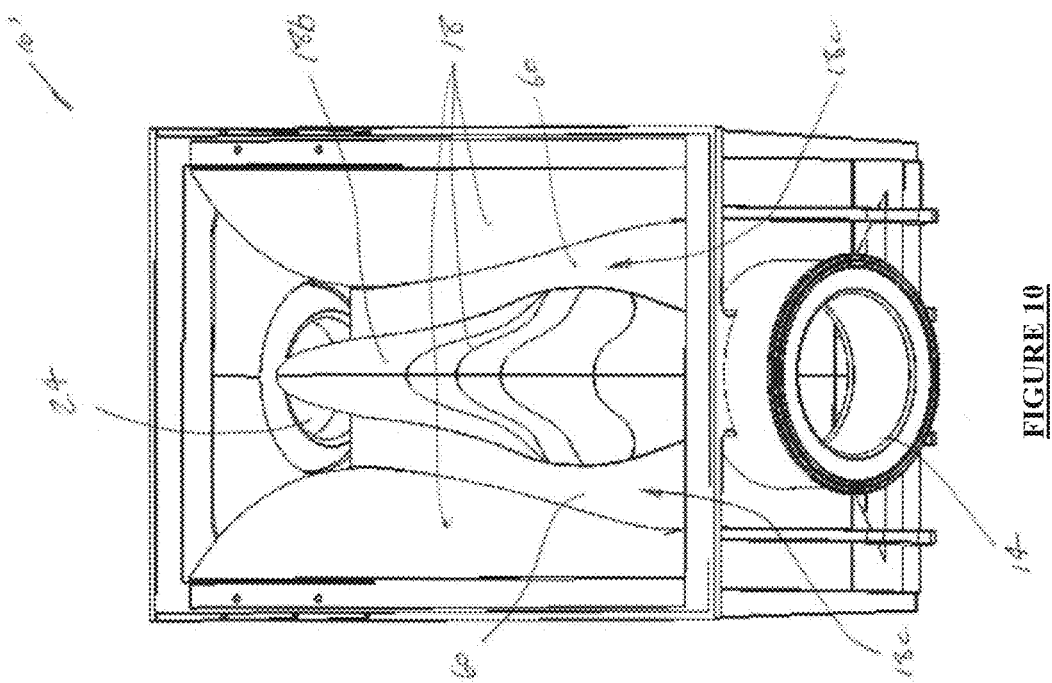
FIG. 10 shows a top perspective view of the device of FIG. 7, wherein the top of the tank is cut away to allow internal components to be seen.
Figure 9:
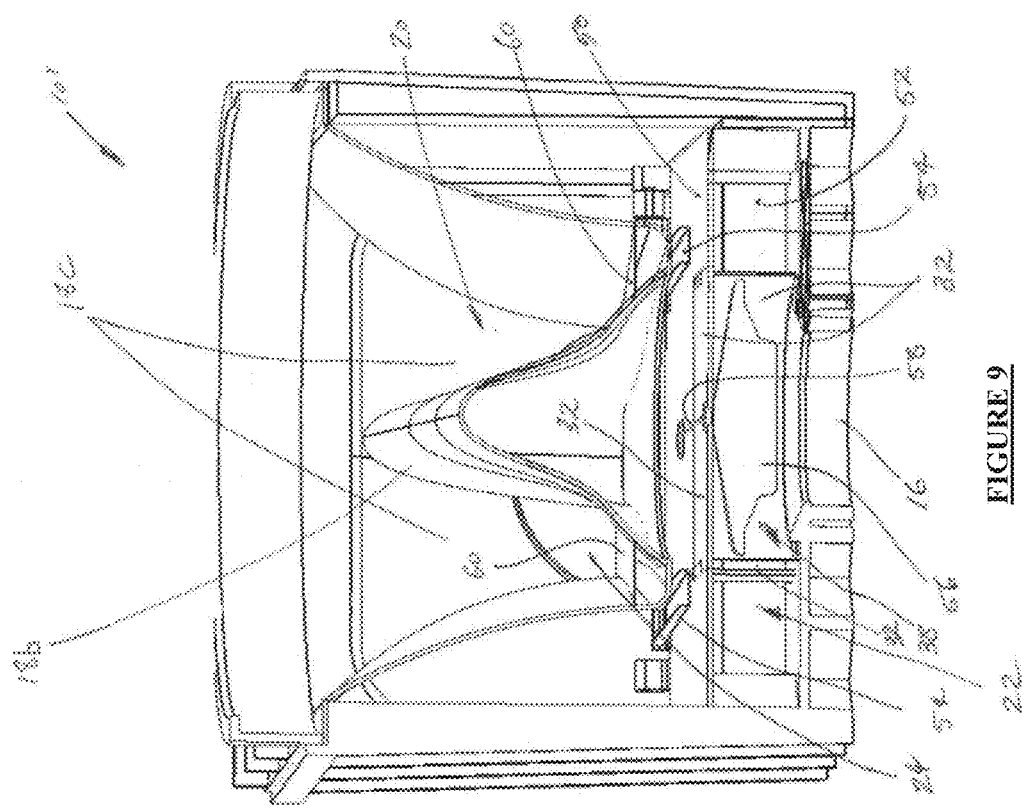
FIG. 9 shows a central vertical transverse cross section of the device of FIG. 7, wherein the device is shown with its bypass opening open ready for an inflow event.
Figure 11:
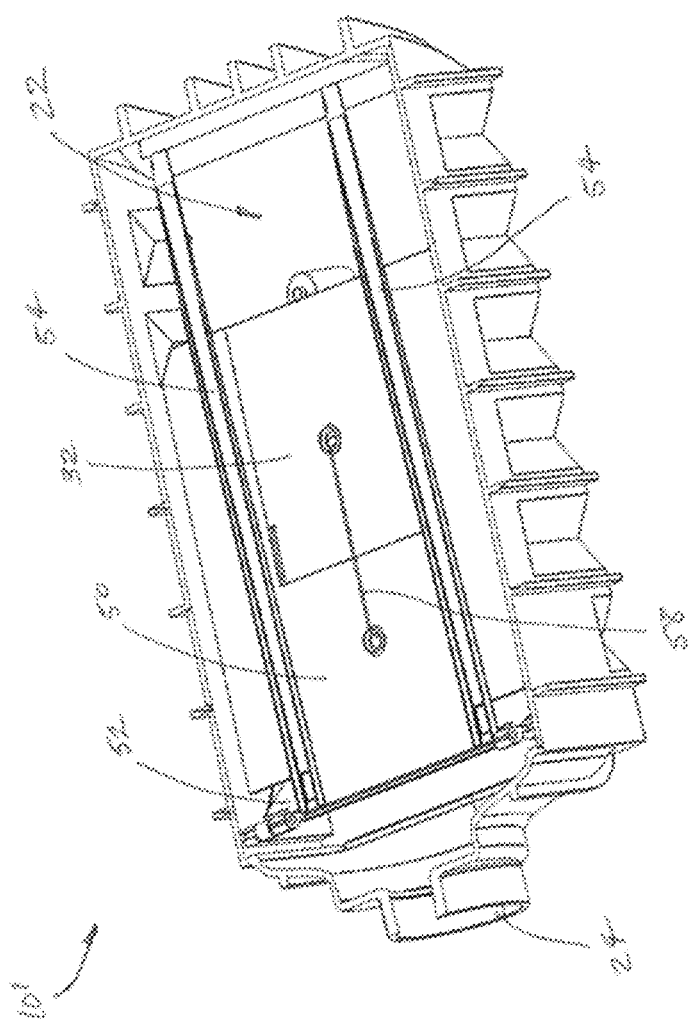
FIG. 11 shows a top perspective view of the device of FIG. 7, wherein parts of the device above a lower extremity of the coarse filter are cut away to allow parts below the coarse filter to be seen.

Reference is now made to FIGS. 7-11 of the drawings, which show a water quality improvement device 10' having a number of features in common with the device 10 of FIGS. 1-6, where corresponding reference numerals indicate corresponding features with corresponding functionality. The device 10', however, is reconfigured in a rectangular arrangement, having its longitudinal axis extending horizontally, in use, rather than vertically as is the case with device 10.

In device 10', the coarse filter 18 is shaped to slow the velocity of fluid entering the device. Specifically, the upstream surface of the coarse filter 18 defines a central mound 18b extending longitudinally through the tank and a channel 18c on each lateral side of the mound. Fluid entering the device 10' through inlet 14 and/or opening 46 is divided by the mound 18b and directed into the channels 18c. The channels 18c direct relatively coarse pollutants in the fluid toward coarse pollutant discharge opening 24. It will be appreciated that coarse filter 18 acts as a hydrodynamic separator that separates relatively coarse pollutants from the inflow water by slowing the velocity of the water entering the device, thereby increasing the time that the inflowing water stream is in the first region/chamber 20, and thereby increasing the volume of water with the relatively coarse pollutants removed passing through the coarse filter 18 into the second region/chamber 22. As shown, the inlet 14 and the coarse pollutant discharge opening 24 are at opposite longitudinal ends of the device 10'. The floor of channels 18c is angled relative to horizontal toward the coarse pollutant discharge opening 24. A platform 50 is provided below the coarse filter 18 and is angled relative to horizontal away from the coarse pollutant discharge opening 24. A container 52 is hingedly connected to an end of the platform 50 closest the coarse pollutant discharge opening 24, extends from side to side of the tank 12, and is moveable between a first configuration in which it is elevated from the floor of tank 12 and a second configuration in which it engages the floor of tank 10. In the second configuration, the container 52 acts as a gate extending across the tank 12 and preventing fluid passing the coarse filter 18 from flowing to the coarse pollutant discharge opening 24. One or more fluid conduits, in the form of channels 54 extending from the channels 18c, direct a portion of fluid entering the device 10' to the container 52.

The coarse filter 18 and fine filter 32 of device 10' have openings of the same size as those of coarse filter 18 and fine filter 32 of device 10. In device 10', an additional fine filter 60 of 0.4 mm mesh is provided in the base of channels 18c.

Device 10' comprises a bypass mechanism that includes two flow barriers, in the form of a valve member 56 and container 52. The valve member 56 is biased by its self-weight and/or a spring (not shown) into sealing engagement with the outlet 16. The container 52 is connected to the valve member 56 by a tether 58. Accumulation of fluid in the container 52 causes the container to move from its elevated first configuration to its lowered second configuration against the bias of the valve member 56 toward the outlet 16. Lowering of the container 52 raises the valve member 56 out of sealing engagement with the outlet 16 to define the second configuration of the bypass mechanism in which fluid passing the coarse filter 18 is blocked from flowing to opening 24 by the container/gate 52 and instead is allowed to pass through open outlet 16 due to the valve member 56 being raised. In some embodiments, valve member 56 is buoyant, such that buoyancy of the valve member 56 together with accumulation of liquid in the container 52 facilitate automatically moving the bypass mechanism 52, 56 between its first and second configurations.

The container 52 has one or more drain openings (not shown) therein for draining liquid from the container 52. As with the drain openings 40 of device 10, the one or more drain openings of device 10' have a combined area that allows the bypass mechanism to move into its second configuration by allowing liquid to accumulate in the container 52 during an inflow event and, after an inflow event, the drain openings 40 allow drainage of liquid from the container 52 to reset the bypass mechanism to its first configuration.

In device 10', a relationship between the rate at which fluid accumulates in the container 52 and the magnitude of the self-weight and spring force biasing the valve member 56 toward sealing engagement with the outlet 16 governs the delay in the bypass mechanism 52, 56 adopting the second configuration. Similarly to device 10, this delay is for around 2 minutes, depending on the inflow rate, until an initial volume of approximately 0.3 m$^3$ to 0.9 m$^3$ of stormwater has been discharged after commencement of an inflow event of at least the same duration or until each square metre of the catchment served by the device 10' has received, on average, greater than 1.2 mm of precipitation/inflow that reaches the device. During this time interval, the container/gate 52 lowers to close opening 34 and valve member 56 rises to open outlet 16. If the inflow rate into the device 10' is less than 5 L/min, or less than 1.65% of the maximum flow rate through the device, the inflow may be highly with dissolved pollutants. In such low flows, the container/gate 52 will not lower and valve member 56 will not rise, such that the polluted inflow bypasses the outlet 16 and passes through opening 34 under container/gate 52 for discharge through opening 24.

Persons of skill in the art will recognise that device 10' shares many of the applications and advantages discussed above with regard to device 10.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Examples of possible variations and/or modifications include, but are not limited to:

the coarse filter 18 of device 10 being hemi-spherical or another concave shape, or being planar, or being cylindrical;

the coarse filter 18 of device 10' being another shape;

the valve 36 may be resiliently biased toward the closed configuration by a mechanical spring rather than, or in addition to, by buoyancy and may be automatically actuated to discharge fine pollutants by weight of inflowing water;

instead of a valve being open to cause fluid in the device 10 to bypass the outlet 16, as is the case with valve 36, a variation of device 10 may require a valve to be closed to cause fluid to bypass the outlet 16 and, in such a variation, buoyancy of the valve member, alone or aided by other means, may cause the valve to open, optionally against the bias of a mechanical spring, to cause fluid flowing through the device to flow through the outlet;

rather than having an open and closed configuration as such, the valve 36 may instead be configured to move between a first configuration in which it directs liquid passing the coarse filter 18 to bypass the outlet 16 and a second configuration in which it directs liquid passing the coarse filter to flow through the outlet 16;

the lid 44 may comprise a grate or other opening(s) to allow direct inflow from the head of the tank 12 instead of or in combination with the inlet 14;

an upper portion of the device 10 may comprise a riser section to vary the inlet pipe positioning by nominally 100 mm increments;

a plurality of the devices 10, 10' can be used to increase the performance of a catchment stormwater flow management system; and/or using the device 10 in combination with a downstream device optimised to remove pollutants remaining in the stormwater passing through outlet 14.

What is claimed is:

1. A device for improving water quality, said device comprising:

a tank;

an inlet for entry of water into the tank;

an outlet for discharge of water from the tank;

a coarse filter in the tank for filtering relatively coarse pollutants from water fed into the tank through the inlet, the coarse filter having an upstream end and a downstream end, the coarse filter dividing the tank into an upstream first region and a downstream second region, the coarse filter allowing relatively fine pollutants in the water to pass into the second region whilst inhibiting the relatively coarse pollutants from passing into the second region, wherein the inlet is associated with the first region of the tank and the outlet is associated with the second region of the tank;

a bypass mechanism in the tank, the bypass mechanism including one or more flow barriers having a first configuration and a second configuration in which in the first configuration the one or more flow barriers direct water passing the coarse filter to bypass the outlet and instead flow through a bypass opening and in which in the second configuration the one or more flow barriers direct water passing the coarse filter to bypass the bypass opening and instead flow through the outlet, the water passing through the bypass opening in the first configuration being quarantined from the water passing through the outlet in the second configuration, wherein the one or more flow barriers comprise a first flow barrier that is a valve member, the valve member being in sealing engagement with the outlet in the first configuration and out of sealing engagement with the outlet in the second configuration, the bypass mechanism further comprising:

a container connected to the valve member by a tether, the container comprising a drain for drainage of the container after an inflow event to facilitate resetting the bypass mechanism to the first configuration; and a fluid flow pathway for directing a portion of the water passing the coarse filter to the container, wherein:

the valve member is biased toward sealing engagement with the outlet when the container is empty, thereby to configure the bypass mechanism to automatically adopt the first configuration to cause an initial volume of the water passing the coarse filter to bypass the outlet and instead flow through the bypass opening, and accumulation of the portion of the water in the container causes the container to move from a first position, corresponding with the first configuration, to a second position, corresponding with the second configuration, thereby, via the tether, moving the valve member out of sealing engagement with the outlet to cause the bypass mechanism to adopt the second configuration during the inflow event;

a coarse pollutant discharge opening located at the downstream end of the coarse filter and through which the relatively coarse pollutants filtered by the coarse filter are discharged; and a divider in the first region to form a plurality of channels in the first region, each of the channels extending between the inlet and the coarse pollutant discharge opening.

2. The device of claim 1, wherein an upstream surface of the coarse filter defines the divider.

3. The device of claim 1, wherein there are two or more flow barriers and the container is a second flow barrier of the two or more flow barriers, and wherein: in its first position, the container allows water passing the coarse filter to flow to the coarse pollutant discharge opening via the bypass opening; and in its second position, the container closes the bypass opening to block water passing the coarse filter from flowing to the coarse pollutant discharge opening and directs the water to the outlet.

4. The device according to claim 1, the device being configured such that the bypass mechanism is delayed from adopting the second configuration for a predetermined time from commencement of the inflow event of at least the same duration.

5. The device according to claim 1, the device being configured such that the bypass mechanism is delayed from adopting the second configuration until a predetermined initial volume of water entering the device has bypassed the outlet after commencement of the inflow event of at least the same volume, or until each square metre of a catchment served by the device has received, on average, greater than 1.2 mm of precipitation that reaches the device.

6. The device according to claim 1, comprising a fine filter downstream of the coarse filter to filter the relatively fine pollutants in water passing from the second region to the outlet.

7. The device according to claim 6, wherein the fine filter comprises openings therein configured to capture pollutants sized greater than 0.4 mm to 1 mm.

8. The device according to claim 6, wherein the fine filter comprises a 1 mm mesh screen.

9. The device according to claim 6, wherein the fine filter comprises a 40-210 micron screen.

10. The device according to claim 6, wherein the coarse filter comprises openings larger than the openings of the fine filter.

11. The device according to claim 1, wherein the coarse filter comprises openings of approximately 5 mm in diameter.

12. The device of claim 1, wherein the coarse filter defines the divider, the coarse filter being configured to slow the velocity of the water in the first region and thereby to increase a dwell time of the water in the first region.

* * * * *